United States Patent
Horvitz

(10) Patent No.: US 7,417,650 B1
(45) Date of Patent: Aug. 26, 2008

(54) DISPLAY AND HUMAN-COMPUTER INTERACTION FOR A NOTIFICATION PLATFORM

(75) Inventor: Eric J. Horvitz, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1323 days.

(21) Appl. No.: 09/595,401

(22) Filed: Jun. 17, 2000

Related U.S. Application Data

(60) Provisional application No. 60/189,801, filed on Mar. 16, 2000.

(51) Int. Cl.
*C09G 5/00* (2006.01)

(52) U.S. Cl. ............... 345/765; 345/764; 345/767; 345/768; 345/789; 345/811; 345/812; 345/821

(58) Field of Classification Search ............ 345/765, 345/767, 768, 769, 789, 811, 812, 821, 764
See application file for complete search history.

(56) References Cited

U.S. PATENT DOCUMENTS

| | | | | |
|---|---|---|---|---|
| 5,644,363 A | * | 7/1997 | Mead | 348/563 |
| 5,717,877 A | * | 2/1998 | Orton et al. | 345/860 |
| 5,736,974 A | * | 4/1998 | Selker | 345/862 |
| 5,784,124 A | * | 7/1998 | D'Alitalia et al. | 348/564 |
| 5,852,440 A | * | 12/1998 | Grossman et al. | 345/811 |
| 5,859,640 A | * | 1/1999 | de Judicibus | 345/710 |
| 6,144,363 A | * | 11/2000 | Alloul et al. | 345/618 |
| 6,342,908 B1 | * | 1/2002 | Bates et al. | 345/798 |
| 6,425,127 B1 | * | 7/2002 | Bates et al. | 725/32 |
| 6,456,307 B1 | * | 9/2002 | Bates et al. | 345/838 |
| 6,480,207 B1 | * | 11/2002 | Bates et al. | 345/800 |

* cited by examiner

*Primary Examiner*—Matthew C. Bella
*Assistant Examiner*—Mike Rahmjoo
(74) *Attorney, Agent, or Firm*—Amin, Turocy & Calvin, LLP

(57) ABSTRACT

User interfaces for relaying notifications to users are disclosed. In a pulsing mode, information is faded into a predetermined area of a display, where the information has a net value greater than a predetermined or dynamically computed threshold. In a stream-cycling mode, for a number of different information sources, a display time is determined for each notification based on the information's importance. Each information is displayed in turn for a length of time equal to the display time, within the predetermined area of the display. In a stream-stacking mode, information from each of a number of sources is displayed in a corresponding source summary window. When the net value of information in a notification is greater than a predetermined or computed threshold, the information may be streamed in a main notification window and can be journaled in a journal window.

65 Claims, 10 Drawing Sheets

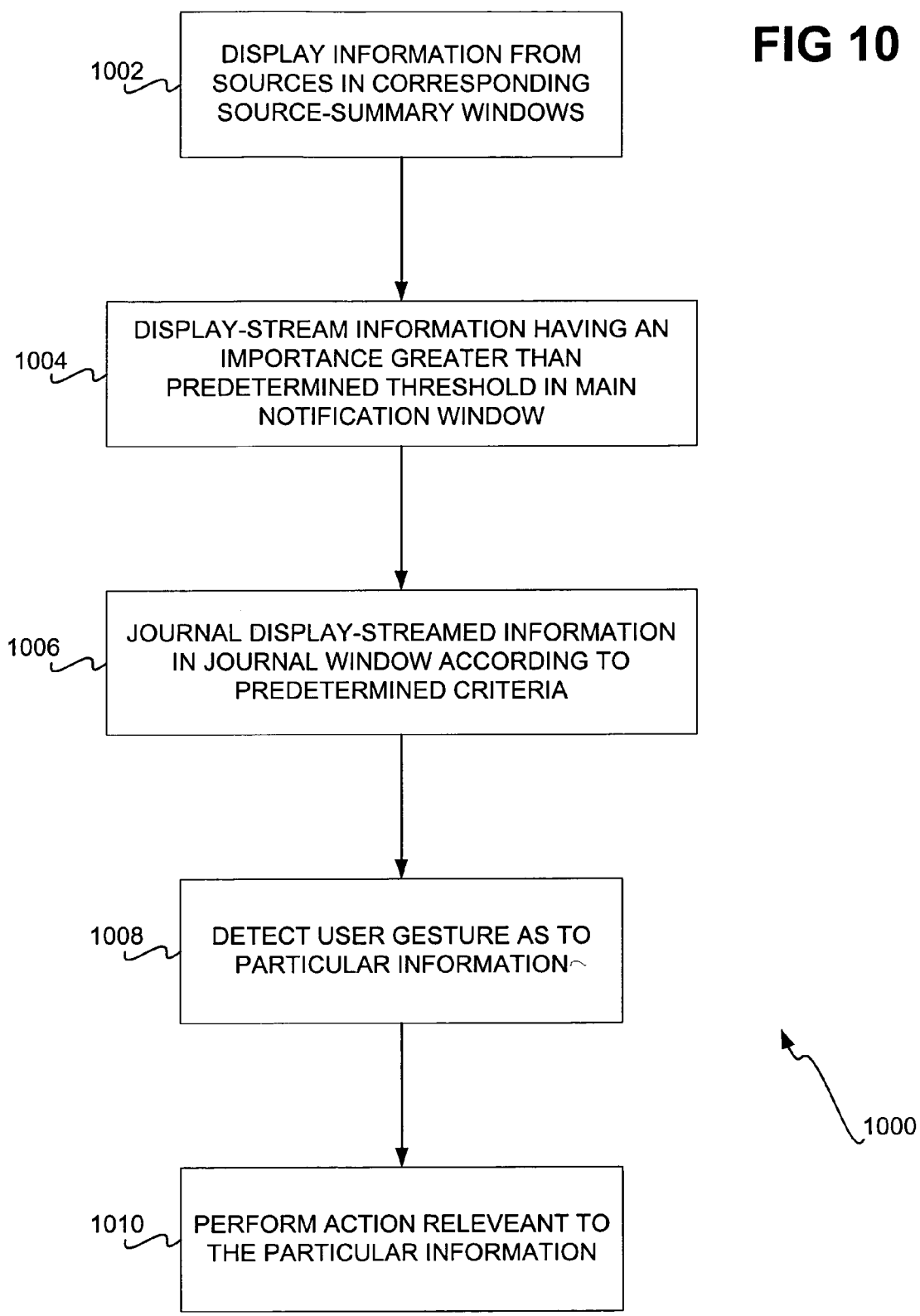

DISPLAY AND HUMAN-COMPUTER INTERACTION FOR A NOTIFICATION PLATFORM

RELATED APPLICATIONS

The present application claims the benefit of the provisional patent application filed on Mar. 16, 2000, entitled "Attentional Systems and Interfaces," and assigned Ser. No. 60/189,801.

FIELD OF THE INVENTION

This invention relates generally to unified receipt and notification of alerts generated by varied devices and applications for conveyance to a user, and more particularly to a user interface for utilization with such unified alert receipt and notification.

BACKGROUND OF THE INVENTION

Many computer users today receive information from a number of different sources, and utilize a number of different devices in order to access this information. For example, a user may receive e-mail and instant messages over a computer, pages over a pager, voice-mail over a phone, such as a cellular ("cell") or landline phone, news information over the computer, etc. This makes it difficult for the user to receive all his or her different information, referred to also as alerts or notifications, wherever the user happens to be.

For example, a user may be away from his or her computer, but receive an important e-mail. The user may have access only to a cell phone or a pager, however. As another example, the user may be working on the computer, and have turned off the ringer and voice-mail indicator on the phone. When an important voice-mail is left, the user has no way of receiving this information on the computer.

Moreover, many of the alerts may not be important to the user—for example, e-mail from the user's manager or co-worker should receive higher priority than the latest sports scores. More generally, the value of the information contained in an alert should be balanced with the costs associated with the disruption of the user by an alert. Both the costs and value may be context sensitive. Beyond notifications about communications, users are alerted with increasing numbers of services, error messages, and computerized offers for assistance.

The prior art does not provide for alerts following the user, for the prioritization of the alerts, nor for considering the potentially context-sensitive value and costs associated with notifications. However, in the cofiled, copending and coassigned patent application Ser. No. 09/596,365 entitled "Notification Platform Architecture," an architecture is described that can receive alerts from a number of different sources, called notification sources, and convey them to any of a number of different outputs, called notification sinks. In one embodiment, one of the notification sinks is a computer, such as a laptop or a desktop computer, such that the notifications are displayed in conjunction with a user interface associated with the computer.

SUMMARY OF THE INVENTION

This invention relates to a user interface for a user to receive notifications. In a pulsing mode, information is faded into a predetermined area of a display, where the information has an importance greater than a threshold, such as represented by a predetermined threshold. The information can be displayed for a length of time based on the importance in one embodiment. In a stream-cycling mode, for a number of different information, a display time is determined for each information based on the information's importance. Each information is then displayed in turn for a length of time equal to the display time, within the predetermined area of the display. In a stream-stacking mode, information from each of a number of sources are displayed in a corresponding source summary window. Information that has an importance greater than a threshold, such as a predetermined threshold, is display-streamed in a main notification window, such as in accordance with the stream-cycling mode, and also can be journaled in a journal window. The journal window allows the user to review the history of notifications that he or she may have missed earlier, and easily access more details about a particular notification.

Thus, embodiments of the invention provide a user interface on which users can receive information that is unrelated to their primary tasks. Information, and changes in information about information, are thus able to presented in different forms, depending on the user's preferences, for example. The invention includes computer-implemented methods, machine-readable media, computerized systems, and computers of varying scopes. Other aspects, embodiments and advantages of the invention, beyond those described here, will become apparent by reading the detailed description and with reference to the drawings.

DETAILED DESCRIPTION OF THE INVENTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

Example Computerized Device

Figure 1:
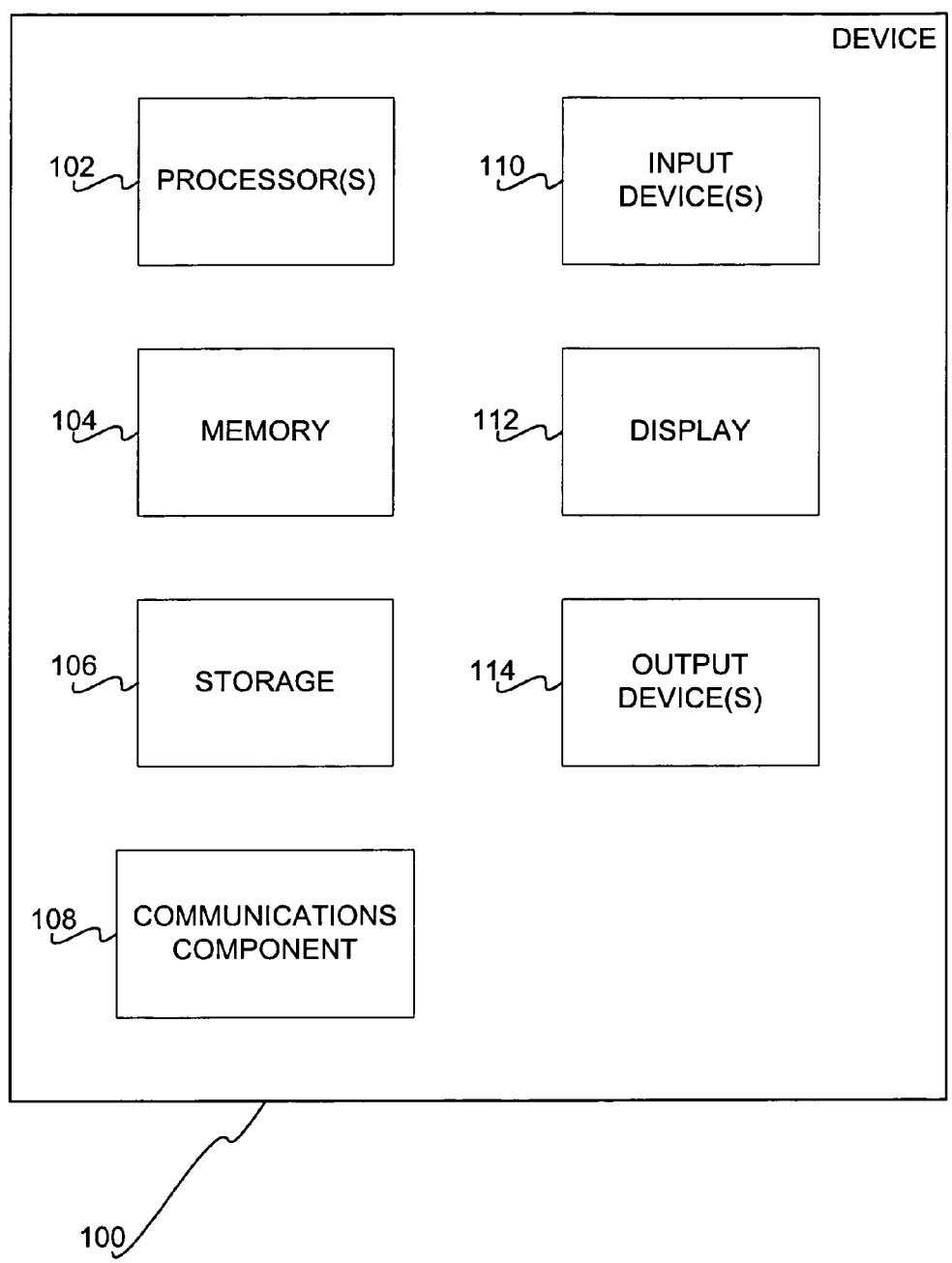
FIG. 1 is a diagram of an example computerized device in conjunction with which embodiments of the invention can be practiced.

Referring to FIG. 1, a diagram of an example computerized device 100 in conjunction with which embodiments of the invention may be practiced is shown. The example computerized device can be, for example, a desktop computer, a laptop computer, a personal digital assistant (PDA), a cell phone, etc.; the invention is not so limited. The description of FIG. 1 is intended to provide a brief, general description of a suitable computerized device in conjunction with which the invention may be implemented. Those skilled in the art will appreciate that the invention may be practiced with other computer system configurations, including hand-held devices, multiprocessor systems, microprocessor-based or programmable consumer electronics, network PC's, minicomputers, mainframe computers, and the like. The invention may also be practiced in distributed computing environments where tasks are performed by remote processing devices that are linked through a communications network.

The device 100 includes one or more of the following components: processor(s) 102, memory 104, storage 106, a communications component 108, input device(s) 110, a display 112, and output device(s) 114. It is noted, that for a particular instantiation of the device 100, one or more of these components may not be present. For example, a PDA may not have any output device(s) 114, while a cell phone may not have storage 106, etc. Thus, the description of the device 100 is to be used as an overview as to the types of components that typically reside within such a device 100, and is not meant as a limiting or exhaustive description of such computerized devices.

The processor(s) 102 may include a single central-processing unit (CPU), or a plurality of processing units, commonly referred to as a parallel processing environment. The memory 104 may include read only memory (ROM) 24 and/or random access memory (RAM) 25. The storage 106 may be any type of storage, such as fixed-media storage devices such as hard disk drives, flash or other non-volatile memory, as well as removable-media storage devices, such as tape drives, optical drives like CD-ROM's, floppy disk drives, etc. The storage and their associated computer-readable media provide non-volatile storage of computer-readable instructions, data structures, program modules and other data. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used.

Because the device 100 may operate in a network environment, such as the Internet, intranets, extranets, local-area networks (LAN's), wide-area networks (WAN's), etc., a communications component 108 can be present in or attached to the device 100. Such a component 108 may be one or more of a network card, such as an Ethernet card, an analog modem, a cable modem, a digital subscriber loop (DSL) modem, an Integrated Services Digital Network (ISDN) adapter, etc.; the invention is not so limited. Furthermore, the input device(s) 110 are the mechanisms by which a user indicates input to the device 100. Such device(s) 110 include keyboards, pointing devices, microphones, joysticks, game pads, satellite dishes, scanners, etc. The display 112 is how the device 100 typically shows output to the user, and can include, for example, cathode-ray tube (CRT) display devices, flat-panel display (FPD) display devices, etc. In addition, the device 100 may indicate output to the user via other output device(s) 114, such as speakers, printers, etc.

Example Architecture

Figure 2:
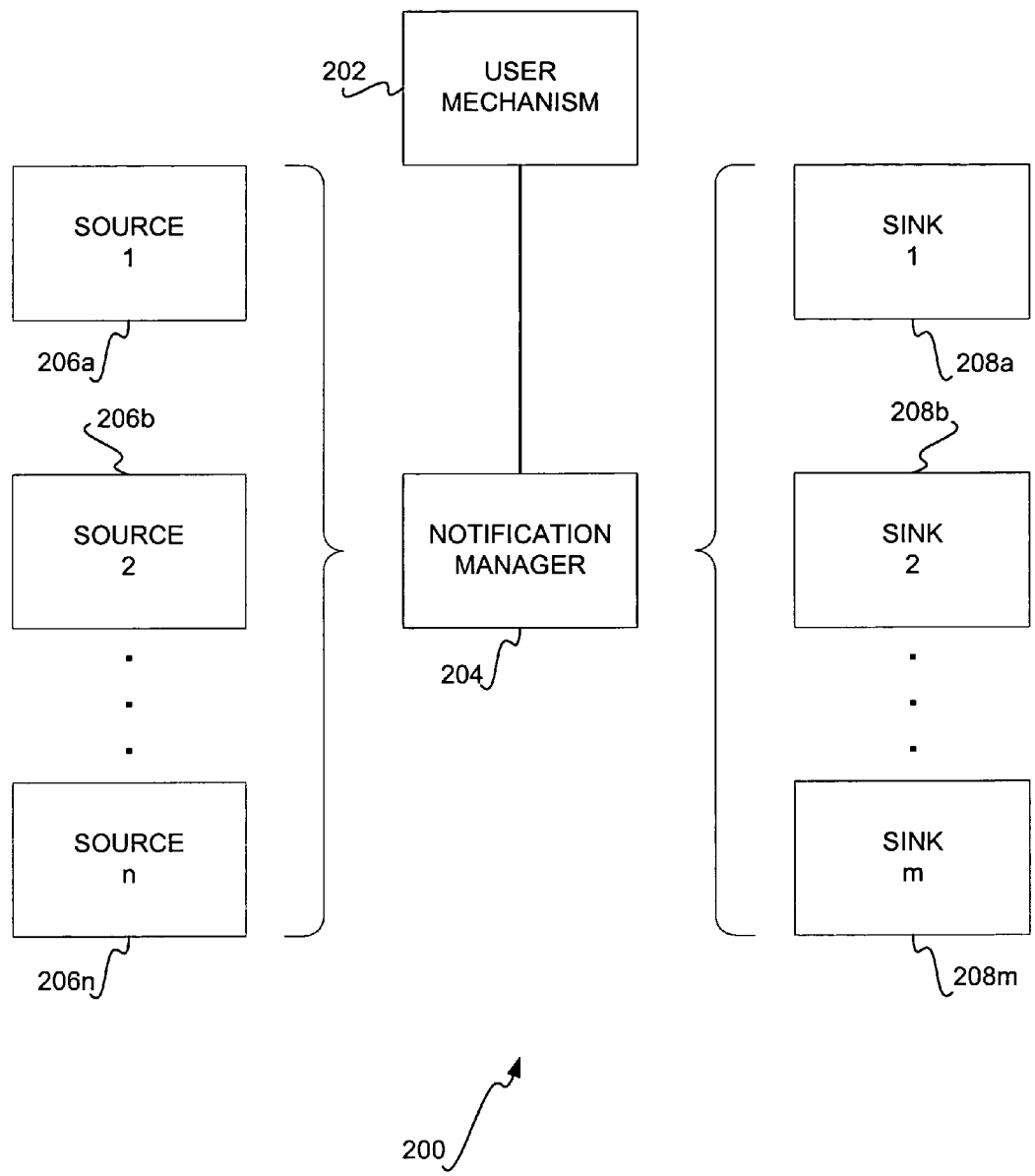
FIG. 2 is a diagram of a notification architecture in conjunction with which embodiments of the invention can be practiced.

In this section of the detailed description, an example notification architecture in conjunction with which embodiments of the invention may be used is described, in conjunction with the diagram of FIG. 2. In one embodiment, the architecture utilized is that which is particularly described in the copending, cofiled, and coassigned patent application Ser. No. 09/596,365 entitled "Notification Platform Architecture". The architecture 200 of FIG. 2 includes a user mechanism 202, a notification manager 204, a number of notification sources 206a, 206b, ..., 206n, and a number of notification sinks 208a, 208b, ..., 208m, where there can be any number of sinks and sources. In general, the notification manager 204 conveys notifications from the sources 206 to the sinks 208, based on information stored in the user mechanism 202. Each of the components of the architecture 200 of FIG. 2 is now described in turn.

The user mechanism 202 stores information regarding variables and parameters of a user that influence notification decision-making. For example, the parameters may include contextual information, such as the user's typical locations and attentional focus or activities per the time of day and the day of the week, and additional parameters conditioned on such parameters, such as the devices users tend to have in different locations. Such parameters may also be functions of observations made autonomously via one or more sensors. For example, profiles may be selected or modified based on information about a user's location as might be provided by a Global Positioning System (GPS) subsystem, on information about the type of device being used and/or the pattern of usage of the device, the last time a device of a particular type was accessed by the user, etc. Beyond relying on sets of predefined profiles or dynamic inference, the notification architecture can also allow users to specify in real-time his or her state, such as the user not being available except for important notifications for the next x hours, or until a given time.

Parameters can include default notification preference parameters regarding a user's preference as to being disturbed by notifications of different kinds in different settings, which can be used as the basis from which to make notification decisions by the notification manager 204, and the basis upon which a particular user can make changes. The parameters may include default parameters as to how the user wishes to be notified in different situations, such as by cell phone, by pager, etc. The parameters can include such assessments as the costs of disruption associated with being alerted by different modes in different settings. That is, the parameters can include contextual parameters indicating the likelihoods that the user is in different locations, the likelihoods that different devices are available, and the likelihoods of his or her attentional status at a given time, as well as notification parameters indicating how the user desires to be notified at a given time.

The information stored by the user mechanism 202 can be inclusive of contextual information determined by the mechanism 202. The contextual information is determined by the mechanism 202 by discerning the user's location and attentional status based on one or more contextual information sources. The mechanism 202, for example, may be able to determine with precision the actual location of the user via a global-positioning system (GPS) that is a part of a user's car, cell phone, etc. The mechanism 202 may also use a statistical model to determine the likelihood that the user is in a given state of attention (e.g., open to receiving notification, busy and not open to receiving notification, etc.) by considering background assessments and/or observations gathered through considering such information as the type of day (e.g., weekday, weekend, holiday), the time of day, the data in the user's calendar, and observations about the user's activity.

Each of the sources 206a, 206b, ..., 206n is able to generate notifications intended for the user. For example, the sources 206 may include communications, such as Internet and network-based communications, local desktop computer-based communications, and telephony communications, as well as software services, such as intelligent help, background queries, automated scheduling, etc.

For example, e-mail may be generated as notifications by an e-mail notification source such that they are prioritized, where the host application program generating the notifications assigns the e-mail with relative priorities corresponding to the likely importance or urgency of the e-mail to the user. The e-mail may also be sent without regard to their relative importance to the user. Desktop-centric notifications can include an automated dialog with the goal of alerting a user to a potentially valuable service that he or she may wish to execute (e.g., scheduling from a message), information that the user may wish to review (e.g., derived from a background query), or errors and other alerts generated by a desktop computer. Internet-related services can include notifications including information that the user has subscribed to, such as headlines of current news every so often, stock quotes, etc.

Other notifications can include background queries (e.g., while the user is working, text that the user is currently working on may be reviewed such that background queries regarding the text are formulated and issued to search engines), scheduling tasks from a scheduling or other program, etc. Notification sources 206 can themselves be push-type or pull-type sources. Push-type sources are those that automatically generate and send information without a corresponding request, such as headline news and other Internet-related services that send information automatically once subscribed to. Pull-type sources are those that send information in response to a request, such as e-mail being received after a mail server is polled.

Each of the notification sinks 208a, 208b, ..., 208n is able to provide the notifications to the user. For example, such notification sinks 208 can include computers, such as desktop and/or laptop computers, handheld computers, cell phones, landline phones, pagers, automotive-based computers, etc. It is noted that some of the sinks 208 can convey notifications more richly than other of the sinks 208. For example, a desktop computer typically has speakers and a relatively large color display attached to it, as well as having a high bandwidth for receiving information when attached to a local network or to the Internet. Therefore, notifications can be conveyed by the desktop computer to the user in a relatively rich manner. Conversely, most cell phones have a small display that is black and white, and receive information at relatively low bandwidth. Correspondingly, the information associated with notifications conveyed by the cell phone usually must be shorter and geared towards the phone's known limitations. Thus, the content of a notification may differ depending on whether it is to be sent to a cell phone or a desktop computer. In one embodiment, one or more of the notification sinks includes a user interface as described in subsequent sections of the detailed description.

The notification manager 204 accesses the information stored by the user mechanism 202, and makes a decision as to which of the notifications it receives from the sources 206 to convey to which of the sinks 208 based on this information. Furthermore, the manager 204 is able to determine how the notification is to be conveyed, depending on which of the sinks 208 it has selected to send the information to. For example, it may determine that the notification should be summarized before being provided to a given of the sinks 208. The manager 204 can be a computer program executed by a processor of a computer from a machine-readable medium such as a memory thereof.

The invention is not limited to how the manager 204 makes its decisions as to which of the notifications to convey to which of the notification sinks, and in what manner the notifications are conveyed. For example, a decision-theoretic analysis can be made, such that the notification manager is designed to infer important uncertainties about variables including a user's location, attention, device availability, and amount of time until the user will access the information if there were no alert, and make notification decisions about whether to alert a user to a notification, and if so, the nature of the summarization and the best device or devices to employ for relaying the notification. In general, the manager 204 determines the net expected value of a notification, considering the fidelity and transmission reliability of each available notification sink, as well as the attentional cost of disturbing the user, the novelty of the information to the user, the time until the user will review the information on his or her own, and the potentially context-sensitive value of the information and the increasing and/or decreasing value over time of the information contained within the notification.

The inferences made about uncertainties thus may be generated as expected likelihoods of values such as the cost of disruption to the user with the use of a particular mode of a particular device given some attentional state of the user, etc. The notification manager 204 makes decisions as to what the user is currently attending to and doing (based on, for example, contextual information), where the user currently is, how important the information is, what is the cost of deferring the notification, how distracting would a notification be, what is the likelihood of getting through to the user, what is the fidelity loss associated with a given notification sink, etc. Therefore, ultimately, the notification manager 204 performs an analysis, such as a decision-theoretic analysis, of pending and active notifications, evaluates context-dependent variables provided by information sinks and sources, and infers key uncertainties, such as the time until a user is likely to review provided information and the user's location and current attentional state.

Furthermore, the notification manager 204 can access information stored in a user profile by the user mechanism 202 in lieu of or to support a personalized decision-theoretic analysis. For example, the user profile may indicate that at a given time, the user prefers to be notified via a pager, and only if the notification has a predetermined importance level. Such information can be used as a baseline from which to start a decision-theoretic analysis, or can be the only manner by which the manager 204 determines how and whether to notify the user.

User Interface Predetermined Area of Desktop Screen

Figure 3:
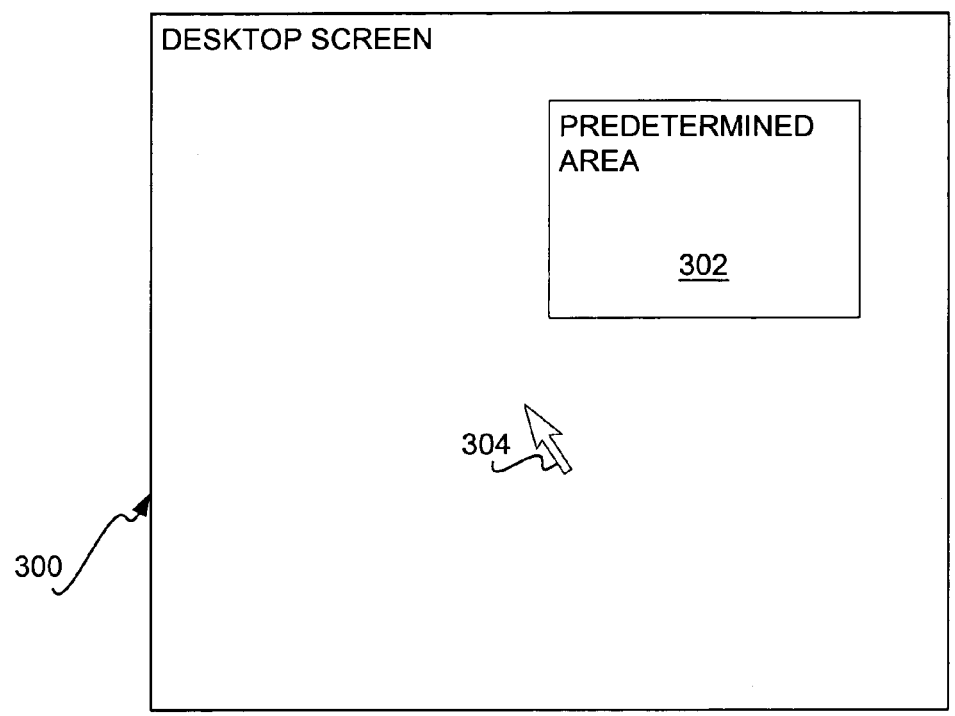
FIG. 3 is a diagram showing a predetermined area of a desktop screen in which information can be displayed in accordance with embodiments of the invention.

In this section of the detailed description, an overview of a user interface according to an embodiment of the invention is shown. An example of such an interface is specifically shown in the diagram of FIG. 3, where there is a predetermined area 302 within a desktop screen 300 of a display of a computer, such as a laptop computer, desktop computer, etc. As shown in FIG. 3, the predetermined area 302 is in the upper right-hand of the screen 300. However, the invention itself is not so limited; for example, in the stream-stacking embodiment of the invention described later in the detailed description, the area 302 can be an entire column on the right-hand of the screen 300. The screen 300 is desirably such that a user is able to control movement of a cursor 304 thereon, as is conventionally used in conjunction with graphic users interfaces as can be appreciated by those of ordinary skill within the art. The cursor 304 as shown in FIG. 3 is an arrow pointer; however, the invention itself is not so limited.

The predetermined area 302 is utilized for displaying information in conjunction with embodiments of the invention. As used herein, information can refer to a singular piece of information, or plural pieces of information. In one embodiment, the information comprises notification alerts, also referred to as just alerts or notifications, as has been described. Thus, embodiments of the invention are concerned with the display of such information within the predetermined area 302 of the desktop screen 300 as described in subsequent sections of the detailed description. In one embodiment, the desktop screen 300 is used by a user for a primary task—for example, working on a word processing document, a spreadsheet workbook, etc.

The information displayed within the area 302 can in this embodiment be unrelated to the primary task. Furthermore, in one embodiment, the information displayed may be information specifically unrequested by the user. For example, the information may alert the user to an email, such that the user, while may having requested that email over a predetermined importance threshold be conveyed to him or her, has not specifically requested that the email be displayed in the area 302. This is how the term unrequested is used in this application.

In one embodiment, the screen 300 is part of a display that is able to handle generalized rendering, including, for example, content formatted in accordance with the Dynamic HyperText Markup Language (HTML) format known within the art. In such an embodiment, multiple sources of information are able to send rich interfaces, including buttons, links, animations, audio, etc. (e.g., for source branding), such that this information is rendered within the constraints and higher-level design conventions or style conventions of the user interface described herein. However, the invention itself is not so limited.

In the following sections of the detailed description, a pulsing embodiment of the invention, a stream-cycling embodiment of the invention, and a stream-stacking embodiment of the invention are described. Each of these is a particular embodiment by which information can be displayed in the predetermined area 302 of the desktop screen 300, for example. The sections of the detailed description describe one example of each such embodiment, such that the invention itself is not limited to these examples. Furthermore, in one embodiment, two or three of the embodiments can be used, such that there can be a pulsing mode, a stream-cycling mode, and a stream-stacking mode where the user is able to switch among the modes. For example, a system can include a display, a processor, and a machine-readable medium storing a computer program executed by the processor to cause entry into one of the modes.

Furthermore, besides the user switching among the modes, in one embodiment, a notification manager, as has been described in the previous section of the detailed description, can make this decision, for example. Either the user or the notification manager can in one embodiment can also make the decision as to switchable features within a given mode, such as within the pulsing, the stream-cycling, and/or the stream-stacking mode. The presence or absence of audio heralds can also in one embodiment be a decision left to either the user or the notification manager.

Pulsing Embodiment

Figure 4:
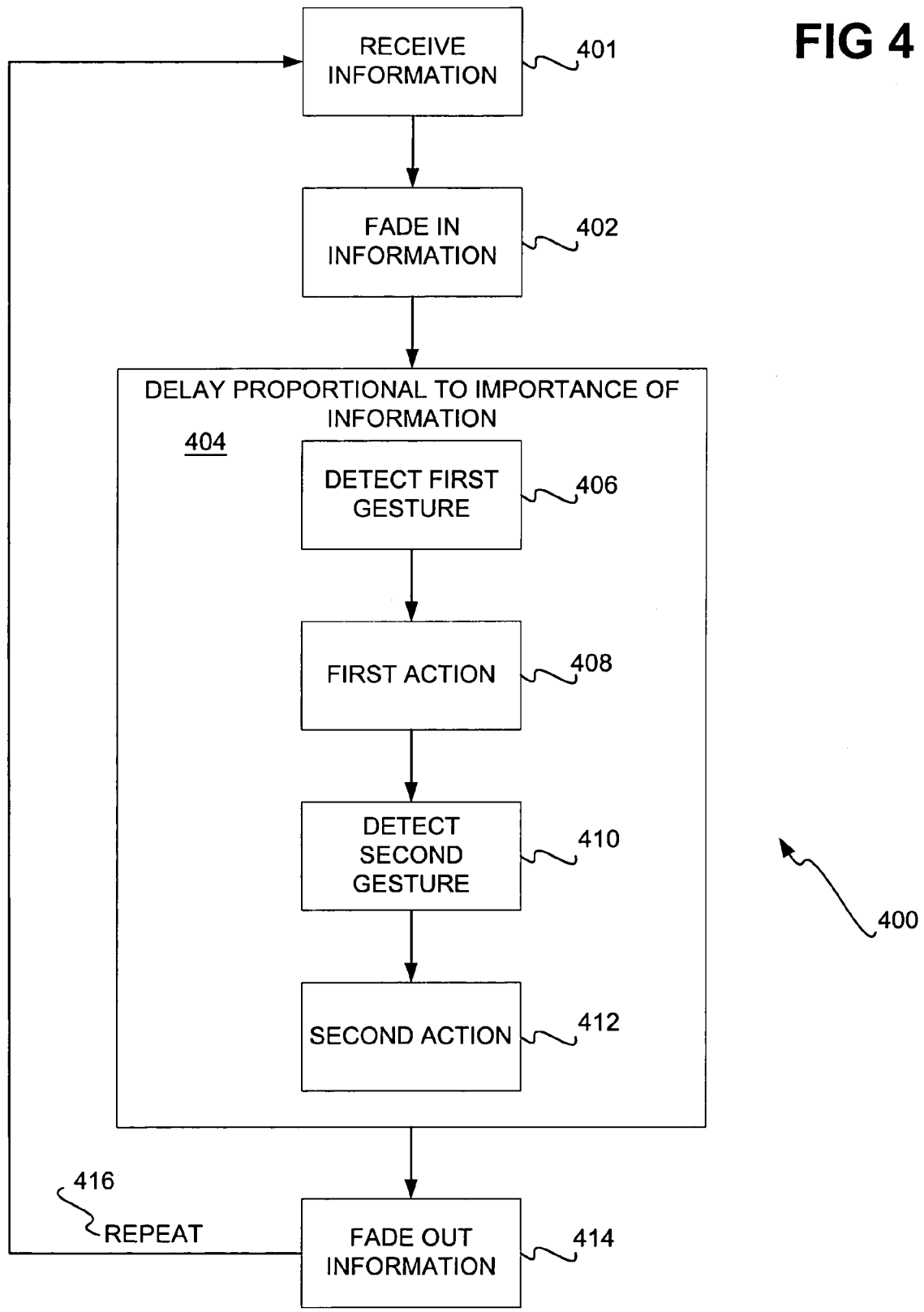
FIG. 4 is a flowchart of a pulsing embodiment of the invention.

In this section of the detailed description, a pulsing embodiment of the invention is described. Referring to FIG. 4, a flowchart of a method 400 of such a pulsing embodiment is shown. The method can in some embodiments be computer-implemented. A computer-implemented method is desirably realized at least in part as one or more programs running on a computer—that is, as a program executed from a computer-readable medium such as a memory by a processor of a computer. The programs are desirably storable on a machine-readable medium such as a floppy disk or a CD-ROM, for distribution and installation and execution on another computer. The program or programs can be a part of a computer system or a computer, such as that described in conjunction with FIG. 1 in a previous section of the detailed description. The invention is not so limited, however.

In 401, information is received. As has been described, the information may be unrequested information unrelated to a primary task of the user. The information can comprise a notification alert. The information has an importance greater than a threshold, such as defined by a predetermined threshold. The measure of the importance is not limited by the invention, nor the threshold.

In 402, the information is faded into the predetermined area of a display. In one embodiment, the information is faded in by displaying the information in the predetermined area and increasing the alpha value of the information as displayed in the predetermined area, as known within the art, to a first predetermined level, at a given rate. The first predetermined level can be based on the importance of the information. For example, the level can be proportional to the information's importance. Increasing the alpha value of the information increases the opacity of the display of the information in the predetermined area. Thus, increasing the alpha value to a level based on the importance of the information means that more important information is displayed with a greater opacity—that is, with less translucency—than less important information. In one embodiment, however, the predetermined level is less than 100%—that is, it is less than 100% opacity. Furthermore, in one embodiment, an audio herald to alert the user to the information faded into the predetermined area is also played in 402. The audio herald can be a predetermined sound, etc.; the invention is not so limited.

In 404, there is a delay for a length of time based on the importance of the information. For example, the length of time can be proportional to the information's importance. The delay is thus desirably the length of time that the information will be displayed to the user. Thus, information with a greater importance can be displayed longer than information with a lesser importance. In one embodiment, during the length of time delayed, 406, 408, 410 and 412 of the method 400 are performed, although the invention itself is not so limited.

In 406, a first predetermined user gesture relevant to the fading of the information into the predetermined area of the display is detected. For example, this first gesture can be the movement of the cursor over the predetermined area of the display (e.g., by a user causing such movement via utilization of a pointing device such as a mouse, etc.), although the invention itself is not so limited. Another gesture can include particular speech or voice by the user that is recognized, etc. In response to the first gesture, in 408, a first action is performed. In one embodiment, the action comprises increasing the alpha value of the information as displayed in the predetermined area to a second predetermined level greater than the first predetermined level, such as 100%. In such an embodiment, the first gesture thus causes the information to become more opaque. In another embodiment, more detailed information (e.g., as related to an alert) is displayed in the predetermined area of the display in 408, in response to the first gesture.

In 410, a second predetermined user gesture relevant to the fading of the information into the predetermined area of the display is detected. For example, this second gesture can be the movement of the cursor to an area of the display such that the cursor is no longer over the predetermined area of the display (e.g., by a user causing such movement via utilization of a pointing device such as a mouse, etc.), although the invention itself is not so limited. Another gesture is particular speech of voice by the user that is recognized. In response to the second gesture, in 412, a second action is performed. In one embodiment, the action comprises decreasing the alpha value of the information as displayed in the predetermined area back to the first predetermined level, from the second predetermined level it was previously increased to in 408. In another embodiment, the more detailed information that may have been displayed in the predetermined area of the display in 408 is replaced by the information as was previously faded thereinto in 402.

In 414, once the delay of 404 has passed, the information is faded out from the predetermined area of the display. For example, in one embodiment this involves decreasing the alpha value of the information as displayed in the predetermined area at a given rate, and then not displaying the information in the predetermined area any longer. The method of 400 can be repeated, as indicated by 416. That is, new information can be received in 401, which may have a new importance, such that the new information is faded into the predetermined area of the display in 402, etc. It is noted that in one embodiment, the fading in and out of the information into the predetermined area is such that whatever was already displayed on the predetermined area stays there, as can be appreciated by those of ordinary skill within the art. That is, the information faded into the predetermined area is displayed on top of whatever is already there—the level to which the alpha value of the information faded in is increased thus determines how translucent or opaque the information faded in is, and thus how much of the information can be seen by the user, and how much of whatever is already there can be seen.

Figure 5:
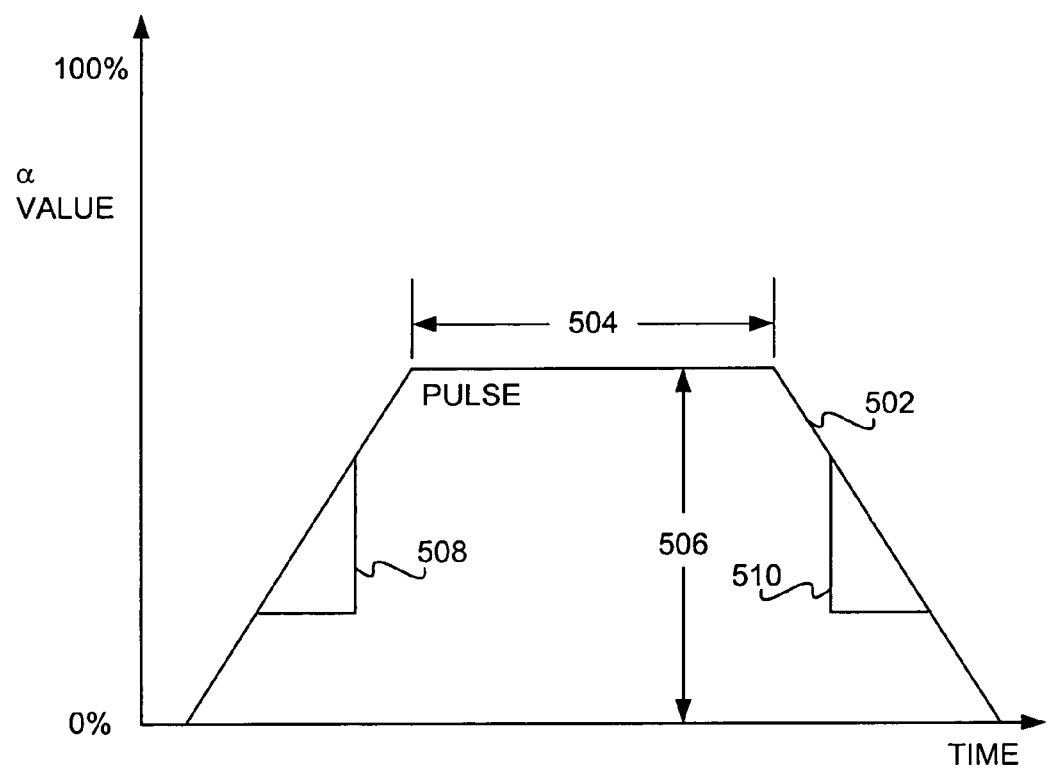
FIG. 5 is a diagram of a pulse in accordance with a pulsing embodiment of the invention.
Figure 5:
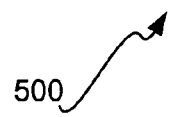

The embodiment of the invention described in conjunction with the method 400 of FIG. 4 is referred to as a pulsing embodiment because information is "pulsed" to a determined alpha for a determined length of time. This is illustrated by reference to FIG. 5, in which a diagram 500 of such a pulse 502 is shown, according to an embodiment of the invention. The pulse 502 has a height 506 representing the alpha value level to which the information as displayed in the predetermined area is increased, a length 504 representing the length of time at which the information is displayed in the predetermined area at this alpha value level, a first slope 508 representing the rate at which the information is faded to this alpha value level, and a second slope 510 representing the rate at which the information is faded from this level. In one embodiment, the height 506 and the length 504 are based on the importance of the information being pulsed (e.g., in one embodiment, such that they are proportional to the importance). In one embodiment, the slope 508 and/or the slope 510 is constant, although the invention itself is not so limited; furthermore, the slopes 508 and 510 can be equal to one another.

In one embodiment of the invention, there is a tab, button, or other item on the display that allows the user to immediately cause the display of the next notification by selecting this item. For example, clicking on a button indicates that the user wants to see the next notification, even if this notification has not reached the necessary value for display on its own. Such a notification, for instance, may not have an importance greater than the threshold for independent display.

Stream-Cycling Embodiment

Figure 6:
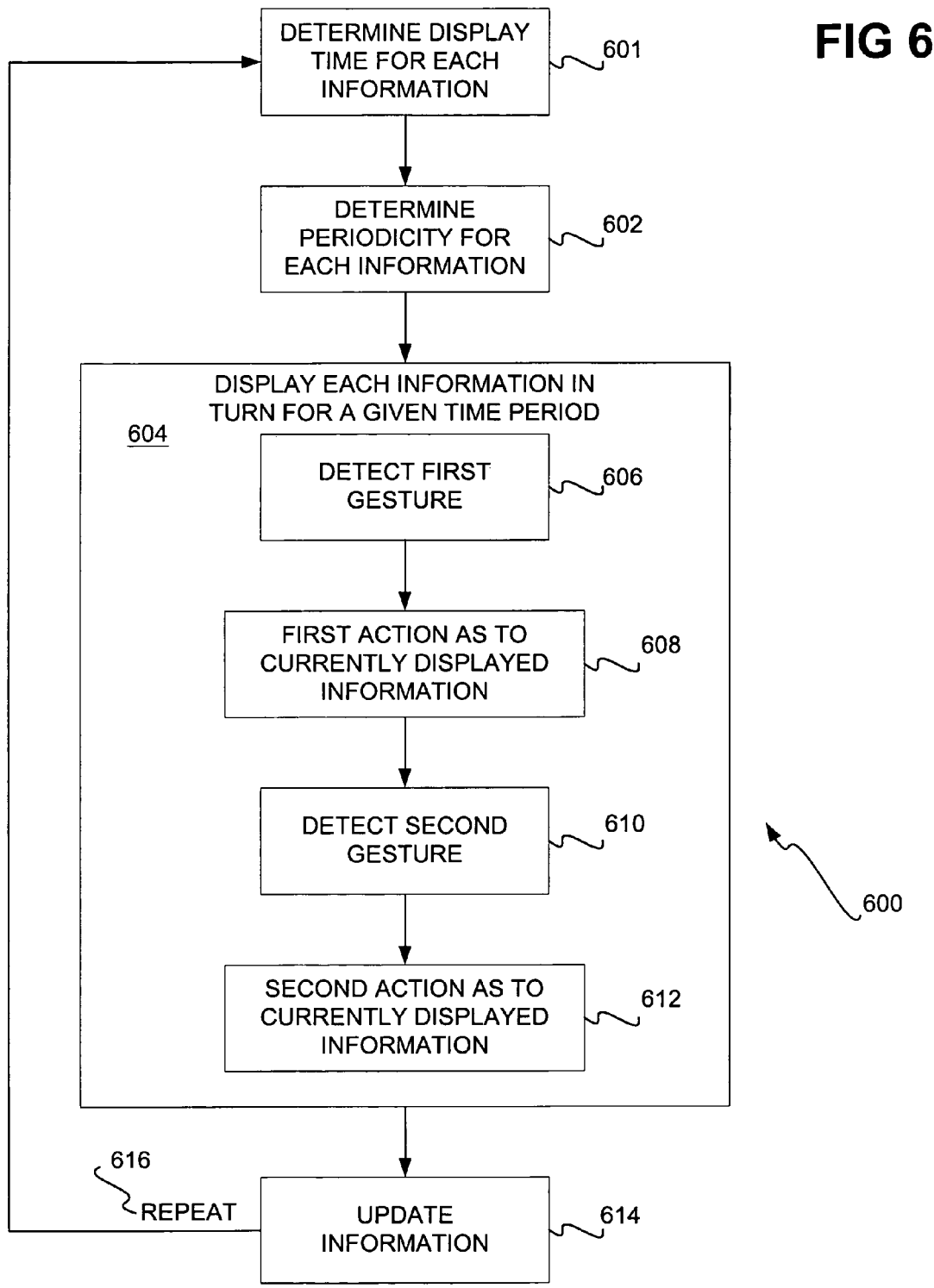
FIG. 6 is a flowchart of a stream-cycling embodiment of the invention.

In this section of the detailed description, a stream-cycling embodiment of the invention is described. Referring to FIG. 6, a flowchart of a method 600 of such a stream-cycling embodiment is shown. The method can in some embodiments be computer-implemented. A computer-implemented method is desirably realized at least in part as one or more programs running on a computer—that is, as a program executed from a computer-readable medium such as a memory by a processor of a computer. The programs are desirably storable on a machine-readable medium such as a floppy disk or a CD-ROM, for distribution and installation and execution on another computer. The program or programs can be a part of a computer system or a computer, such as that described in conjunction with FIG. 1 in a previous section of the detailed description. The invention is not so limited, however.

In 601, for each of a number of different information, a display time is determined. The display time for an information (singular) is the length of time at which this information will be displayed in the predetermined area of the display. In one embodiment, the length of time is based on the importance of the information, where each information has an importance. For example, the display time may be proportional to the importance, although the invention is not so limited. Furthermore, as has been described, the information may be unrequested information unrelated to a primary task of the user. The information can comprise a notification alert.

In 602, in one embodiment (that is, 602 is optional), a periodicity is determined for each information. The periodicity for an information is the number of times that the information will be displayed in the predetermined area of the display over a given time period. In one embodiment, the periodicity is based on the importance of the information; for example, it may be proportional to the importance. Thus, more important information may be displayed more often than less important information during the given time period. In the embodiment where 602 is not performed, each information has a periodicity equal to one—that is, each information is displayed only once for the given time period.

In 604, for a given time period, each information is displayed in the predetermined area of the display a number of times equal to its periodicity, for a length of time equal to its display time. Thus, a first information can be displayed, then the second information, et seq., until all the information has been displayed during this given time period. In one embodiment, each of the information can be faded into and then out of the predetermined area, with a delay in-between equal to the display time, as has been described in the previous section of the detailed description (e.g., by raising the alpha value, delaying, and then lowering the alpha value). In such an embodiment, a first predetermined level to which the alpha value of an information is increased can be based on the information's importance, as has also been described in the previous section of the detailed description; that is, the alpha value is ultimately set to the first predetermined level for a length of time equal to the display time. In one embodiment, an audio herald to alert the user to each information displayed is also played, for each information, or only for information exceeding a threshold, such as a predetermined threshold. The audio herald can be a predetermined sound, etc.; the invention is not so limited. In one embodiment, during the given time period (to which the invention is not particularly limited), 606, 608, 610 and 612 of the method 600 are performed, although the invention itself is not so limited.

In 606, a first predetermined user gesture relevant to a current information being displayed in the predetermined area of the display is detected. For example, this first gesture can be the movement of the cursor over the predetermined area of the display (e.g., by a user causing such movement via utilization of a pointing device such as a mouse, etc.), although the invention itself is not so limited. Another gesture can include particular speech or voice by the user that is recognized, etc. In response to the first gesture, in 608, a first action is performed. In one embodiment, the action comprises "holding" the current information being displayed in the predetermined area, such that no other information is displayed in the predetermined area until the second gesture is detected in 610.

That is, effectively the display time of the currently displayed information is temporarily increased, and the given time period is increased, for a length of time equal to that length of time during which the current information is held in the predetermined area—until the second gesture is detected in 610. In another embodiment, the first action performed in 608 comprises increasing the alpha value of the current information as displayed in the predetermined area to a second predetermined level greater than the first predetermined level, such as 100%. In such an embodiment, the first gesture thus causes the current information to become more opaque. In another embodiment, more detailed information (e.g., as related to an alert) is displayed in the predetermined area of the display in 608, in response to the first gesture.

In 610, a second predetermined user gesture relevant to the current information being displayed in the predetermined area of the display is detected. For example, this second gesture can be the movement of the cursor to an area of the display such that the cursor is no longer over the predetermined area of the display (e.g., by a user causing such movement via utilization of a pointing device such as a mouse, etc.), although the invention itself is not so limited. Another gesture is particular speech of voice by the user that is recognized. In response to the second gesture, in 612, a second action is performed. In one embodiment, the second action comprises the "releasing" of the current information previously being "held" in the predetermined display area, such that subsequent information can continue to be displayed in turn in the predetermined area. In one embodiment, the action comprises decreasing the alpha value of the information as displayed in the predetermined area back to the first predetermined level, from the second predetermined level it was previously increased or set to in 608. In another embodiment, the more detailed information that may have been displayed in the predetermined area of the display in 608 is replaced by the information as was previously displayed in 602.

In 614, once the given time period in which all the information has been displayed in 604 has elapsed, all the information is updated. For example, 614 can include adding new information, and deleting old information. Deletion of information may, for example, be based on the lowest priority information, information that has already been displayed a predetermined number of times, etc.; the invention is not so limited. Similarly, the new information that is added can include that for which the importance exceeds a predetermined threshold, etc.; the invention is not so limited. The method 600 of FIG. 6 is then repeated, as indicated by 616. Thus, in 601, a new display time for each of the information as has been updated is determined, etc.

The embodiment of the invention described in conjunction with the method 600 of FIG. 6 is referred to as a stream-cycling embodiment because information is "streamed"—a first piece of information is displayed in the predetermined area, then a second piece, etc., over the given time period. This is illustrated by reference to FIG. 7, in which a diagram 700 of such a stream-cycling wheel 702 is shown, according to an embodiment of the invention. The wheel 702 has a number of slots 704a, 704b, 704c, ..., 704n. Each slot 704 corresponds to an instance of a piece of information being displayed during a given time period. Each slot has a time delay corresponding to how long the piece of information is displayed during the given time period. For example, the slot 704c has a time delay represented by the length of the arc 706, where slots with longer arcs have greater corresponding time delays. Each information is allocated to a number of slots equal to the periodicity of the information. Thus, information with a periodicity of one is allocated to one slot. It is noted that the number of slots and the given time period can both be dynamic, such that when the information is updated, the number of slots can increase and decrease equal to the sum total of the periodicities of all the information, and such that the given time period over which all the instances of the information are displayed can be equal to the sum total of the time delays of the instances.

Figure 7:
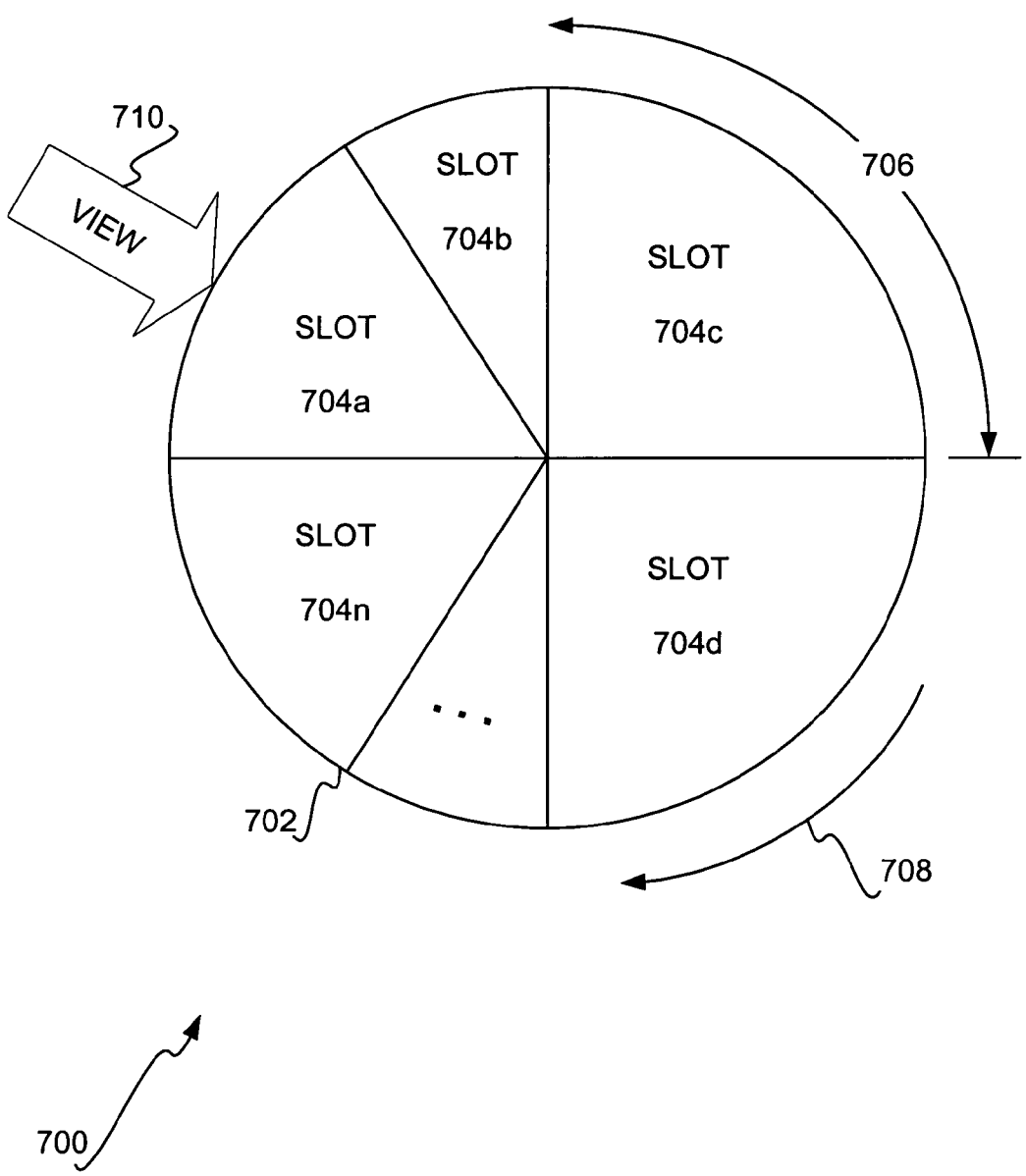
FIG. 7 is a diagram of a stream-cycling "wheel" in accordance with a stream-cycling embodiment of the invention.

The wheel 702 turns, as indicated by the arrow 708, such that the viewing arrow 710 pointing to the wheel 702 specifically points to different slots of the wheel 702 over the given time period. The slot 704 to which the arrow 710 is currently pointing contains the information that is to be currently displayed in the predetermined area of the display. Thus, as the wheel 702 turns during the given time period, different slots are pointed to by the arrow 710, such that different information is displayed in the predetermined area. The turning rate of the wheel 702 is such that the wheel 702 makes one complete rotation over the given time period. It is noted that the wheel 702 of FIG. 7 is a conceptual view of the stream-cycling embodiment of the invention, and that in actuality such a wheel does not have to be implemented to implement this embodiment.

In one embodiment of the invention, one piece of information that is stream-cycled is a summary page, which is information that contains the high-level summary of the most critical notifications in the current cycle, or, more generally of greater amounts of information as might be drawn from a larger notification store. Selection of a particularly referenced notification within this summary by the user causes the immediate display of the notification. In one embodiment, there is more than one summary page, where each can contain clusters of sets of information, including related information that is chunked—for example, a summary page for all communications (e.g., instant messages, email, incoming telephone calls, etc.), a summary for all automated services, etc. Furthermore, in another embodiment of the invention, there are explicit sets of controls that allow the user to stop the cycling of information, to click rapidly through the cycle and pause where he or she wishes to pause, to drill down, etc. In one embodiment, the information presented by stream-cycling can be displayed on a separate display.

Stream-Stacking Embodiment

Figure 8:
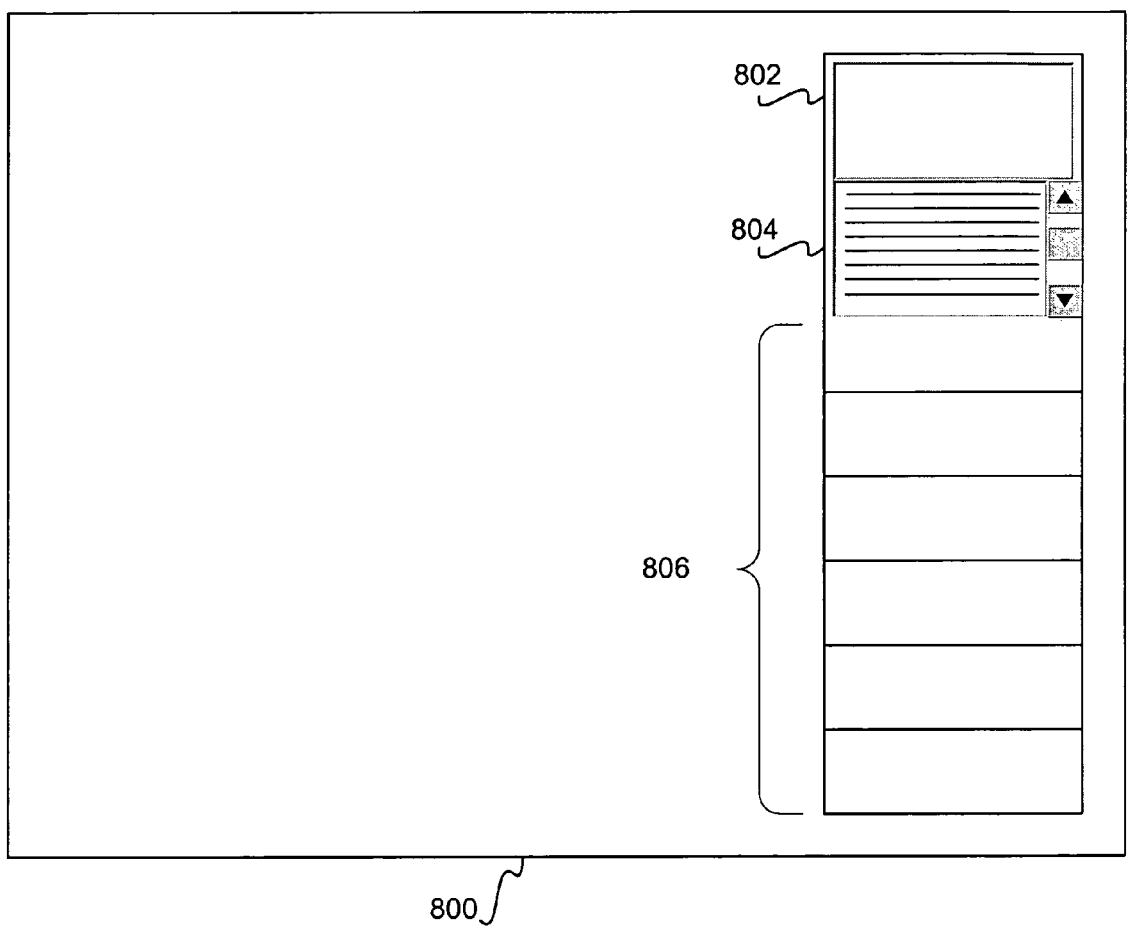
FIGS. 8 and 9 are display diagrams of a stream-stacking embodiment of the invention; and, FIG. 10 is a flowchart of a stream-stacking embodiment of the invention.

In this section of the detailed description, a stream-stacking embodiment of the invention is described. The diagram of FIG. 8 shows a display 800 according to such a stream-stacking embodiment of the invention. The display 800 includes a main notification window 802, a journal window 804, and a number of source summary windows 806, all of which are said to be displayed in a predetermined area of the display 800 (e.g., a screen thereof). There is a number of information sources, such as the notification sources as have been described previously. Each of the information sources generates information, such as unrequested information that can include information unrelated to a primary task of the user as has been described, and displays the information in a corresponding one of the source summary windows 806. As has also been described, the information can comprise a notification alert.

Each piece of information has an importance, the measure of which is not limited by the invention. Information that has an importance greater than a threshold, such as a predetermined threshold, also not limited by the invention, is displayed in a stream-cycling manner in the main notification window 802. For example, the stream-cycling manner can be in accordance with the stream-cycling embodiment of the invention that has been described, where each of the information is faded into the main notification window 802 for a length of time, and then faded out, etc. However, the invention itself is not so limited. Displaying the information in a stream-cycling manner is also referred to herein as display-streaming the information. As displayed in the main notification window 802, the information may be a more detailed version thereof than that which is displayed in one of the source summary windows 806, in one embodiment.

Furthermore, in one embodiment, information that has been display-streamed in the main notification window 802 is journaled in the journal window 804, according to a predetermined criteria not limited by the invention. For example, once a particular piece of information has been displayed in the main notification window 802, a one-line summary of the information is added to the journal window 804, referred to herein generically as a journal entry, such that the window 804 displays a list of such summaries. The list of the window 804 in one embodiment is scrollable by the user, so that the user is able to examine all the information that has already been display-streamed in the main notification window 802.

In one embodiment, the predetermined criteria limiting the information that is journaled, or added, to the journal window 804 is information that has not been indicated by the user as having been viewed by him or her. For example, in one embodiment, the user indicates that information currently being displayed in the main notification window 802 has been viewed by him or her by performing a predetermined user gesture, such as causing movement of a cursor over the main notification window 802, which is also referred to as hovering. The predetermined criteria for journaling can also be user controlled. In general, the journal is employed to capture the full history of attempts to relay information to a user. A journal entry may include the source of the information, a high-level title or summary, and/or information about actions that may have been undertaken with respect to the notification.

In one embodiment, an action is performed in response to a predetermined user gesture relevant to the information being displayed in the main notification window 802, any of the source summary windows 806, or being journaled in the journal window 804. For example, the predetermined user gesture can be causing movement of a cursor over the main notification window 802, any of the source summary windows 806, or a journal entry in the journal window 804, and selecting the information displayed therein. Selecting can be caused by the user in one embodiment by clicking an appropriate input device button, although the invention is not so limited. The action performed in response to this gesture is not limited by the invention. However, in one embodiment, the action includes displaying further information, such as more detailed information, related to the information that has been the subject of the relevant gesture.

Figure 9:
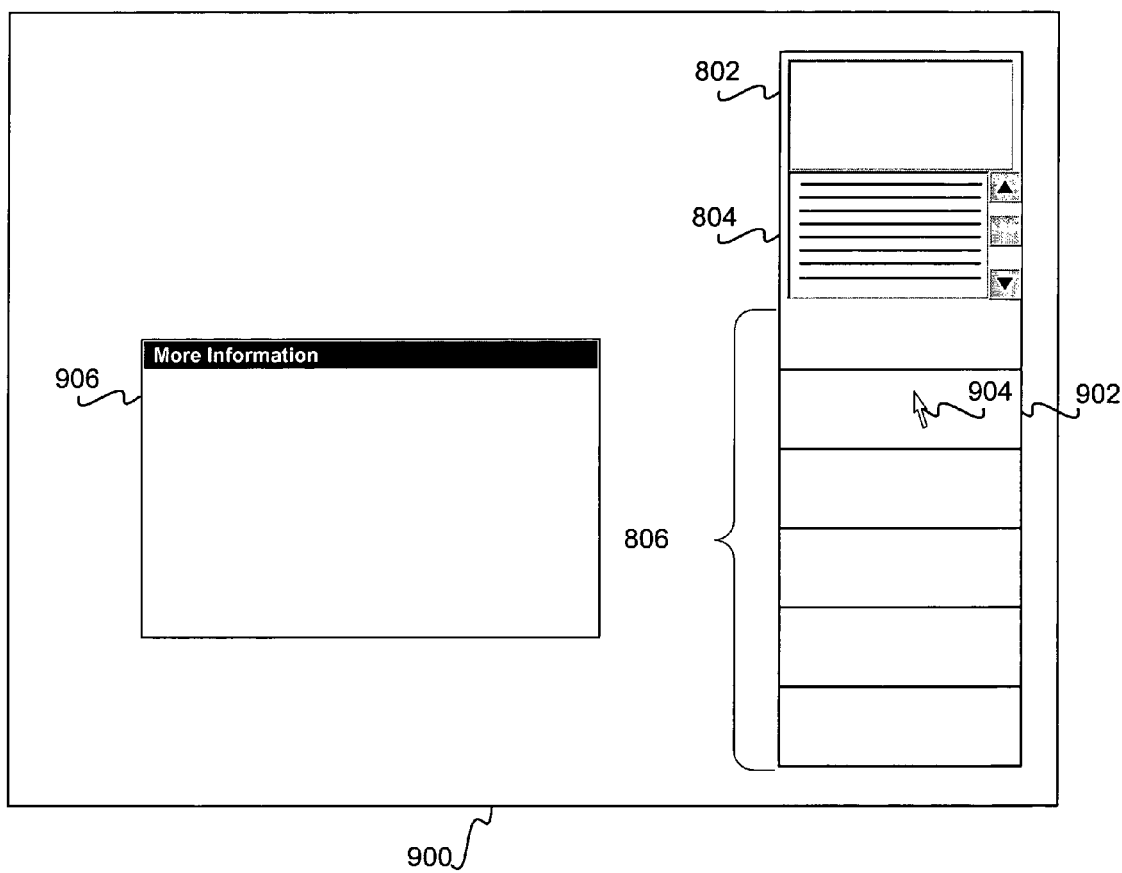

An example of this is shown in the diagram of FIG. 9. In the display 900, the user has caused movement of the cursor 904, shown in FIG. 9 as a pointer although the invention is not so particularly limited, over the source summary window 904 of the source summary windows 806, and is assumed to have selected the information being displayed in the source summary window 904. The source of information for the window 904 is referred to as a user-desired source, since it is the source that the user has performed a gesture relevant thereto. In response to the gesture, an action has been performed, specifically, the display of the window 906, which would include more detailed information regarding the information being displayed in the source summary window 904. Note that while the example of FIG. 9 is specific to the user performing a predetermined user gesture relevant to the information being displayed in one of the source summary windows 806, the invention itself is not so limited, and the gesture could also be relevant to either the information being displayed in the main notification window 802, or one of the journal entries journaled in the journal window 804.

As can be appreciated by those of ordinary skill within the art, the stream-stacking embodiment of the invention as has been described and as has been illustrated in conjunction with FIGS. 8 and 9 is amenable to various extensions. For example, there can be a "simple mode" toggle, in which either all of the windows 802, 804 and 806 are displayed, only two of the types of windows (viz., window 802, window 804 and windows 806 each being a window type), or only one of the types of windows. Furthermore, the number of source summary windows 806 can be increased or decreased by the user. The source summary windows 806 can also in one embodiment be minimized so that the information displayed therein is an icon representing the information sources for the windows 806, such that user-caused cursor hovering over a particular of the windows 806 causes display of the information generated by the corresponding source.

Referring to FIG. 10, a flowchart of a method 1000 of a stream-stacking embodiment of the invention is shown. The method can in some embodiments be computer-implemented. A computer-implemented method is desirably realized at least in part as one or more programs running on a computer—that is, as a program executed from a computer-readable medium such as a memory by a processor of a computer. The programs are desirably storable on a machine-readable medium such as a floppy disk or a CD-ROM, for distribution and installation and execution on another computer. The program or programs can be a part of a computer system or a computer, such as that described in conjunction with FIG. 1 in a previous section of the detailed description. The invention is not so limited, however. The method 1000 can incorporate aspects of the stream-stacking embodiment as it has been described in conjunction with FIGS. 8 and 9 already, as well.

In 1002, information from a number of sources is displayed. The information from each source is displayed in a corresponding source-summary window. The information can be unrequested information unrelated to a primary task of the user. In 1004, information that has an importance greater than a threshold, such as a predetermined threshold, is display-streamed in the main notification window. The information as displayed in the main notification window can in one embodiment be more detailed than as it is displayed in the source-summary window corresponding to the source of the information. In 1006, the information that has been display-streamed in the main notification window is journaled in the journal window, such as by a journal entry being added thereto, according to a predetermined criteria.

As has been described, the user is able to have an action performed relevant to any information being displayed in any of the source-summary windows or the main notification window, or being journaled in the journal window, by performing a predetermined user-gestured as to the particular (user-desired) information. Thus, in 1008, such a user gesture is detected as to particular information that is being displayed in one of the source-summary windows or the main notification window, or which has a journal entry in the journal window. In response thereto, in 1010 an action is performed that is relevant to this information. For example, a more detailed version of the information can be displayed in one embodiment of the invention.

The embodiment of the invention as has been described in this section of the detailed description is referred to as a stream-stacking embodiment because information is both "streamed" in the main notification window, as well as is stacked in both the source summary windows and the journal window. Thus, a user is able to learn of important information by only referencing the main notification window, and is able to examine past information that has been displayed in the main notification window by referring to corresponding journal entries for this information in the journal window. The user is also able to see the current information being generated by a given source, such as a notification source, by referencing the source summary window for that source. The information of the source summary windows is displayed regardless of its importance, whereas only important information is displayed in the main notification window and journaled in the journal window.

Furthermore, in one embodiment of the invention, only high-level summary information is associated with each source. For example, an email-related source may display information about the overall status of information from that source—such that there are ten unread messages with a given priority, and the highest priority message is from a particular user regarding a particular subject matter. Clicking or hovering on the source can than cause the display of a broader user interface for the source application, the most recent notification, etc. In another embodiment of the information, information is streamed or cycled within each source display, such as independent versions of the stream-cycling embodiment of the invention described in the previous section of the detailed description. Furthermore, in embodiments of the invention where a larger main notification window is included, clicking or otherwise selecting a particular source can cause display of the details of the source information, such that this information has focus. Subsequent selection of the notification can thus cause display of even further details of this information, or a broader user interface for this source.

User Interaction with Information

In the previous sections of the detailed description, different modes by which information can be presented to a user have been described, including a pulsing mode, a stream-cycling mode, and a stream-stacking mode. In this section of the detailed description, further description is provided with respect to the manner by which a user can interact with the information presented via any of these modes. While various user gestures and audio heralds have been noted in the previous sections of the detailed description, this section of the detailed description provides more in-depth description as to how user interaction can be accomplished.

First, user gestures for communicating desire for additional information, and for answering questions posed about potential links and services, are described. In one embodiment, the user causing the hovering of the cursor over a source in the stream-stacking mode can be a signal to the system to provide more detailed information about the summary, that can appear in a pop-up window, as has been described. Thus, the user causing the hovering of the cursor over a window in this embodiment is used as an implicit request from the user for the display of more details about the notification content. For example, if there is a weather report, cursor hovering is a way for the user to ask for more details on the weather, such as humidity, five-day forecast, etc.

Embodiments of the invention encompass other gestures as well. For example, the user positioning the cursor over information that is being streamed, and then selecting the information, such as by clicking on a button of a pointing device like a mouse, can be used in different manners. Selection of Universal Resource Locator (URL) addresses provided in the display may cause access of the information referred to by these addresses, for instance. Clicking in nonspecific regions of an information display asking a question (e.g., "Shall I schedule that for you?") can as another example be taken as an assumed "yes" acknowledging the user's intention to receive the service, while the default of no selection can be taken as a "no" answer.

Next, action and timing for communicating with applications, the notification manager, and/or providing evidence about user awareness of the notification are described. For example, simple user gestures using input devices such as the keyboard or the mouse within some time after a notification appears can be used by the user to convey "Tell me more about this notification." A user gesture such as a wiggle of a pointing device like a mouse or the moving of the cursor into a predefined corner of the display could be used for the user to convey to the system, "What was that?"; "Show that to me again"; or, "Tell me more about this", depending on the initial notification conveyed to the user. For example, if the notification was only an audio herald, such a user gesture (e.g., such as in a corner of the display) could be taken as the user asking "What was that?", leading to the display of the information in a notification window, in accordance with a pulsed mode as has been described.

Gestures can also be used in human-computer interactions to indicate to the notification manager, or more explicitly, to gather information that is relayed to the notification manager, that the user has seen a notification. For example, the user may cause the cursor to hover over a notification within some time frame after the notification has been displayed, as a manner by which to indicate to the notification system that the user has seen this notification. Thus, the system then knows not to re-attempt relaying this notification to the user. A more complex interaction can also provide this indication, such as the user selecting a link presented in the window.

User interaction with a notification journal, as such a journal has been described in a preceding section of the detailed description, is next described. That is, as has been noted, notification summaries can be stored in a notification journal in the stream-stacking mode of the invention. These can be organized by time, notification source, message class, etc., and allow users to revisit or review notifications that may have been missed earlier. Selecting a journal entry thus allows the user to redisplay the notification.

Finally, the use of audio in lieu of or as an enhancement to the display of information is described. The use of audio heralds for announcing the display of notifications that exceed a threshold (such as a predetermined threshold), for example, can be used to further call the user's attention to the notifications. In addition, different sounds can be used for different types of notifications. For example, a scheduling-related notification may have a different sound than an email-related notification.

It is also noted, that while in this application the use of text and/or text and graphics has been described to display information, the invention is not limited to utilizing just text or just text and graphics. For example, in one embodiment, the information is displayed completely graphically, where different shapes and colors are used to indicate the nature and priority of information. As another example, the closer the displayed objects are to the center of the display, the more important they are, where different color regions represent different sources of information. That is, the invention is not limited to a particular notion of high-level graphical and/or textual metaphors used for information.

CONCLUSION

It is noted that, although specific embodiments have been illustrated and described herein, it will be appreciated by those of ordinary skill in the art that any arrangement that is calculated to achieve the same purpose may be substituted for the specific embodiments shown. This application is intended to cover any adaptations or variations of the present invention. Therefore, it is manifestly intended that this invention be limited only by the claims and equivalents thereof.

I claim:

1. A machine-readable medium having instructions stored thereon to cause a processor of a computer to perform a method comprising:
   fading notification-related information having an importance greater than a threshold into a predetermined area of display over data located within the predetermined area via increasing an opacity of the notification-related information upon receipt of the notification-related information, the notification-related information being at least one of dynamically truncated or automatically expanded in accordance with the predetermined area of display or based at least in part on a sink type, the importance of the notification-related information based at least in part on a user location a device availability and a fee associated with disruption to a user based on a device location or an attentional state of the user;
   delaying for a length of time based on the importance of the information; and
   fading the information out of the predetermined area of display via decreasing the opacity of the notification-related information.

2. The medium of claim 1, the information comprises unrequested information unrelated to a primary task of a user.

3. The medium of claim 1, fading the information into the predetermined area of the display comprises increasing an alpha value of the information to a predetermined level based on the importance of the information, and fading the information out of the predetermined area of the display comprises decreasing the alpha value from the predetermined level.

4. The medium of claim 3, the method further comprising:
   playing an audio herald to alert the user to the information faded into the predetermined area of the display; within a predetermined length of time, in response to a first predetermined user gesture relevant to the fading of the information into the predetermined area of the display, increasing the alpha value of the information to a second predetermined level greater than the predetermined level;
   waiting for a second predetermined user gesture relevant to the fading of the information into the predetermined area of the display; and,
   decreasing the alpha value of the information to the predetermined level.

5. A computer-implemented method comprising:
   for each of a plurality of unrequested information unrelated to a primary task of a user and having an importance, determining a display time based on the importance of the information when the unrequested information is obtained; and,
   for a given time period, displaying each of the plurality of unrequested information for a length of time equal to the display time of the information within a predetermined area of a display above data positioned in the predetermined area, the importance of the information ascertained based at least in part on a user location, a device availability, and a fee associated with disruption to the user based on the device location or an attentional state of the user.

6. The method of claim 5 further comprising:
   for each of the plurality of unrequested information, determining a periodicity based on the importance of the information,
   for the given time period, displaying each of the plurality of unrequested information further comprises displaying each a number of times equal to the periodicity of the information.

7. The method of claim 5, further comprising at least one of:
   adding new unrequested information to the plurality of unrequested information; and,
   deleting at least one of the plurality of unrequested information from the plurality.

8. The method of claim 7, further comprising:
   determining a new display time for each of the plurality of unrequested information based on the importance of the information; and,
   for the given time period, displaying each of the plurality of unrequested information for a length of time equal to the new display time of the information.

9. The method of claim 5, displaying each of the plurality of unrequested information comprises setting an alpha value of the information to a predetermined level.

10. The method of claim 5, further comprising in response to a first predetermined user gesture relevant to a currently displayed information of the plurality of unrequested information, increasing temporarily the display time of the currently displayed information until a second predetermined user gesture relevant to the currently displayed information occurs.

11. The method of claim 10, displaying each of the plurality of unrequested information comprises setting an alpha value of the information to a first predetermined level less than a second predetermined level, the method further comprising, in response to the first predetermined user gesture, increasing the alpha value of the currently displayed information temporarily to the second predetermined level.

12. The method of claim 10, further comprising in response to the first predetermined user gesture, displaying more detailed information regarding the currently displayed information on the display.

13. The method of claim 10, the first predetermined user gesture comprises causing movement of a cursor over the predetermined area of the display and the second predetermined user gesture comprises causing movement of a cursor away from the predetermined area of the display.

14. The method of claim 5, further comprising playing an audio herald coincident with displaying each of the plurality of unrequested information when the importance of the unrequested information is greater than a threshold.

15. The method of claim 5, further comprising in response to a predetermined user gesture displaying a previously displayed information of the plurality of requested information.

16. A computer-implemented method comprising:
receiving notification-related information having an importance greater than a threshold, the importance of the notification-related information determined based at least in part on a user location, a device availability, and a fee associated with disruption to the user based on the device location and an attentional state of the user; and,
fading the notification-related information into a predetermined area of display on top of disparate data included in the predetermined area by increasing an opacity of the notification-related information subsequent to the receipt of the notification-related information, the fading includes ascertaining a net expected value of fading the notification-related information into the predetermined area of display based at least in part on a fidelity or transmission reliability of an available sink associated with the predetermined area of display, an attentional cost of disturbing a user, or a novelty of the notification-related information in relation to the user.

17. The method of claim 16, the information comprises information unrequested by a user.

18. The method of claim 16, the information comprises information unrelated to a primary task.

19. The method of claim 16, further comprising:
delaying for a length of time based on the importance of the information; and,
fading the information out of the predetermined area of the display.

20. The method of claim 16, further comprising repeating receiving new information; and,
fading the new information into the predetermined area.

21. The method of claim 16, fading the information into the predetermined area of the display comprises increasing an alpha value of the information to a predetermined level.

22. The method of claim 21, the predetermined level is based on the importance of the information.

23. The method of claim 16, further comprising playing an audio herald to alert the user to the information faded into the predetermined area of the display.

24. The method of claim 16, further comprising:
within a predetermined length of time, in response to a first predetermined user gesture relevant to the fading of the information into the predetermined area of the display, waiting for a second predetermined user gesture relevant to the fading of the information into the predetermined area of the display.

25. The method of claim 24, further comprising:
delaying for a length of time based on the importance of the information; and,
fading the information out of the predetermined area of the display.

26. The method of claim 24, the first predetermined user gesture comprises causing movement of a cursor over the predetermined area of the display.

27. The method of claim 26, the second predetermined user gesture comprises causing movement of a cursor away from the predetermined area of the display.

28. The method of claim 24, fading the information into the predetermined area of the display comprises increasing an alpha value of the information to a predetermined level less than 100%.

29. The method of claim 28, further comprising, in response to the first predetermined user gesture, increasing the alpha value of the information to 100% until the second predetermined user gesture occurs.

30. The method of claim 28, further comprising, in response to the first predetermined user gesture, displaying more detailed information regarding the information on the display.

31. A machine-readable medium having instructions stored thereon to cause a processor of a computer to perform a method comprising:
for each of a plurality of unrequested information having an importance, determining at least a display time based on the importance of the information subsequent to receipt of each of the plurality of unrequested information, the importance of the information ascertained based at least in part on a user location, a device availability, and a fee associated with disruption to the user based on the device location or an attentional state of the user, the unrequested information includes utilization of an animated dialog that alerts a user to at least one of information associated with scheduling a message, data derived from a background query, or errors generated by the device;
over a recurring time period, displaying a summary of each of the plurality of unrequested information within a predetermined area of a display for a length of time equal to the display time of the information; and,
continually updating the plurality of unrequested information, such that the display time of each of the plurality of unrequested information is also updated.

32. The medium of claim 31, the method further comprising:
in response to a first predetermined user gesture relevant to a currently displayed information of the plurality of unrequested information, increasingly temporarily the display time of the currently displayed information until a second predetermined user gesture relevant to the currently displayed information occurs.

33. The medium of claim 32, displaying each of the plurality of unrequested information comprises setting an alpha value of the information to a first predetermined level less than a second predetermined level, the method further comprising, in response to the first predetermined user gesture, increasing the alpha value of the currently displayed information temporarily to the second predetermined level.

34. The medium of claim 32, the method further comprising in response to the first predetermined user gesture, displaying more detailed information regarding the currently displayed information on the display.

35. A computer-implemented method comprising:
for each of a plurality of sources generating unrequested information, displaying a summarized version of the unrequested information in a source summary window for the source upon receipt of the unrequested information by a sink; and,
display-streaming the unrequested information of each source having an importance greater than a threshold in a main notification window and excluding at least the unrequested information with an importance less than the threshold from the main notification window, the display-streaming of the unrequested information of each source having an importance greater than the threshold prioritized based at least in part on an attentional cost of disturbing a user, the unrequested information associated with one or more of scheduling a message, reviewing results from a background query, or viewing alerts generated by the sink, the importance of the unrequested information ascertained based at least in part on the user location, a device availability, and a fee associated with disruption to the user based on the device location and an attentional state of the user.

36. The method of claim 35, further comprising journaling the unrequested information of each source display-streamed in the main notification window in a journal window.

37. The method of claim 35, further comprising journaling the unrequested information of each source displayed-streamed in the main notification window in a journal window that a user has not viewed.

38. The method of claim 37, the user indicates that the unrequested information of a source displayed-streamed in the main notification window has been viewed by the user by performing a predetermined user gesture relevant to the unrequested information.

39. The method of claim 38, the predetermined user gesture comprises causing movement of a cursor over the main notification window when the unrequested information of the source is being displayed-streamed in the main notification window.

40. The method of claim 35, further comprising performing an action in response to a predetermined user gesture relevant to the unrequested information of a source currently being display-streamed in the main notification window.

41. The method of claim 40, the predetermined user gesture comprises causing movement of a cursor over the main notification window and selecting the unrequested information of the source currently being displayed-stream in the main notification window.

42. The method of claim 40, the predetermined action comprises displaying further information regarding the unrequested information.

43. The method of claim 35, further comprising performing an action in response to a predetermined user gesture relevant to the unrequested information of a user-desired source displayed in the source summary window for the user-desired source.

44. The method of claim 43, the predetermined user gesture comprises causing movement of a cursor over the source summary window and selecting the unrequested information of the user-desired source.

45. The method of claim 43, the predetermined action comprises displaying further information regarding the unrequested information.

46. A machine-readable medium having instructions stored thereon to cause a processor of a computer to perform a method comprising:
for each of a plurality of sources generating unrequested information, displaying a summary of the unrequested information in a source summary window for the source upon the computer obtaining the unrequested information;
for the unrequested information of each source having an importance greater than a threshold, display-streaming the unrequested information in a main notification window, the importance determined based at least in part on a user location, a device availability, and a fee associated with disruption to the user based on the device location and an attentional state of the user; and,
journaling the unrequested information of each source displayed stream in the main notification window that satisfies a predetermined criteria in a journal window, the predetermined criteria include a net expected value associated with the unrequested information of each source, the net expected value determined based at least in part on a fidelity or transmission reliability of each source, an attentional cost of disturbing a user, or a time period until the user unaided reviews the unrequested information.

47. The medium of claim 46, the predetermined criteria comprises a user-controllable criteria.

48. The medium of claim 46, the predetermined criteria comprises the unrequested information not having been viewed by the user.

49. The medium of claim 46, the method further comprising performing an action in response to a predetermined user gesture relevant to the unrequested information of a source currently being display-streamed in the main notification window.

50. The medium of claim 46, the method further comprising performing an action in response to a predetermined user gesture relevant to the unrequested information of a user-desired source displayed in the source summary window for the user-desired source.

51. The medium of claim 46, the method further comprising performing an action in response to a predetermined user gesture relevant to user-desired unrequested information journaled in the journal window.

52. The medium of claim 51, the predetermined user gesture comprises causing movement of a cursor over the user-desired unrequested information as journaled in the journal window and selecting the information.

53. The medium of claim 51, the predetermined action comprises displaying further information regarding the user-desired unrequested information.

54. A computerized system comprising:
a display;
a processor; and,
a machine-readable medium storing a computer program executed by the processor to cause entry into one of a pulsing mode, a stream-cycling mode, and a stream-stacking mode;
the pulsing mode comprising receiving unrequested information unrelated to a primary task of a user, the information having an importance greater than a threshold, and fading the information into a predetermined area of the display via increasing an opacity of the information subsequent to receipt of the unrequested information, the fading the information into a predetermined area of the display includes assessing the processor and expanding or summarizing the unrequested information unrelated to the primary task of the user based on the assessing of the processor the importance ascertained based at least in part on a user location a device availability and a fee associated with disruption to the user based at least in part on the device location and an attentional state of the user;
the stream-cycling mode comprising, for each of a plurality of unrequested information unrelated to the primary task of the user, determining a display time based on an importance of the information subsequent to receipt of the unrequested information, and for a given time period, displaying each for a length of time equal to the display time within the predetermined area of the display,
the stream-stacking mode comprising, for each of a plurality of sources generating unrequested information, displaying a summary of the information in a corresponding source summary window subsequent to receipt of the unrequested information, and for the information having an importance greater than the threshold, display-streaming the information in a main notification window.

55. The system of claim 54, the user is able to switch among the modes.

56. The system of claim 54, the pulsing mode further comprises delaying for a length of time based on the importance of the information, and fading the information out of the predetermined area of the display.

57. The system of claim 54, the stream-cycling mode further comprises continually updating the plurality of unrequested information, such that the display time of each of the plurality of unrequested information is also updated.

58. The system of claim 54, the stream-stacking mode further comprises journaling the unrequested information of each source display-streamed in the main notification window that satisfies a predetermined criteria in a journal window.

59. A method that facilitates conveying notifications, comprising:
receiving a notification; and
performing a decision-theoretic analysis in connection with determining whether or not to disrupt a user via presenting the notification to the user above disparate displayed data by increasing opacity of the notification upon receipt of the notification, the decision-theoretic analysis further comprising determining and considering cost of interrupting the user with the notification, the cost of interrupting the user based at least in part on a current attentional state associated with the user, the decision-theoretic analysis further comprising determining a relative importance of the notification based at least in part on a user location, a device availability, and a fee associated with disruption to the user based at least in part on the device location and the current attentional state associated with the user.

60. The method of claim 59, further comprising determining a length of time to display the notification.

61. The method of claim 60, the determination of the length of time being based at least in part on importance of the notification.

62. The method of claim 60, the determination of the length of time being based at least in part on content of the notification.

63. The method of claim 60, the determination of the length of time being based at least in part on context of the notification.

64. A system that facilitates conveying notifications, comprising:
means for receiving a notification;
means for determining a relative importance of the received notification given a cost of disruption to a user, the cost of disruption to the user based at least in part on a current attentional state associated with the user, relative importance of the received notification based at least in part on the user location, a device availability, and a fee associated with disruption to the user based at least in part on the device location and the current attentional state associated with the use; and
means for selectively fading in the notification to the user on top of disparate data for a length of time via increasing an opacity of the notification subsequent to receipt of the notification.

65. The system of claim 64, further comprising means for fading out the notification.

\* \* \* \* \*